G. W. MacKENZIE, Jr.
LIQUID MEASURING APPARATUS.
APPLICATION FILED FEB. 17, 1917.
1,257,722.
Patented Feb. 26, 1918.
4 SHEETS—SHEET 2.
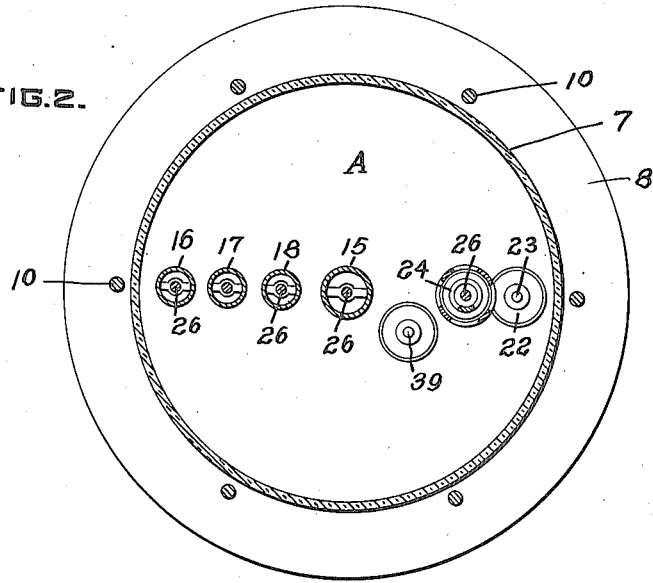
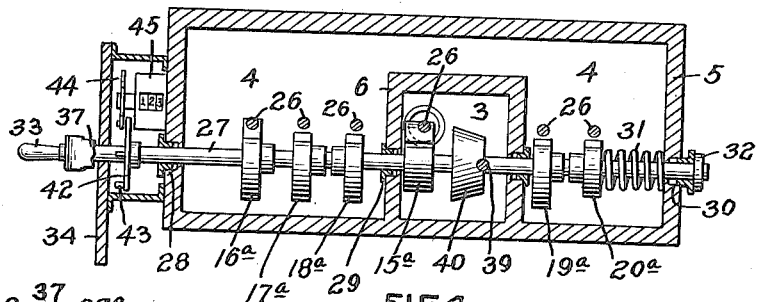
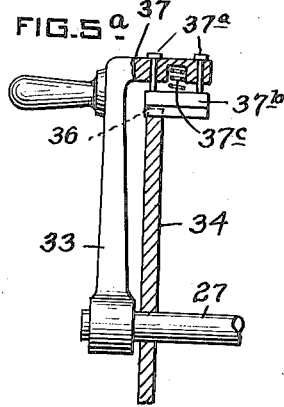
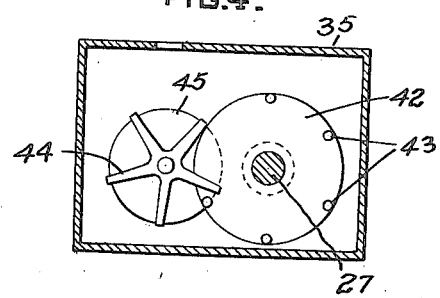
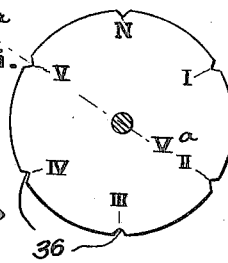
WITNESSES
J. Herbert Bradley.
Ashley H. Brockett.
INVENTOR
George W. Mackenzie Jr.
by C. M. Clarke
his attorney

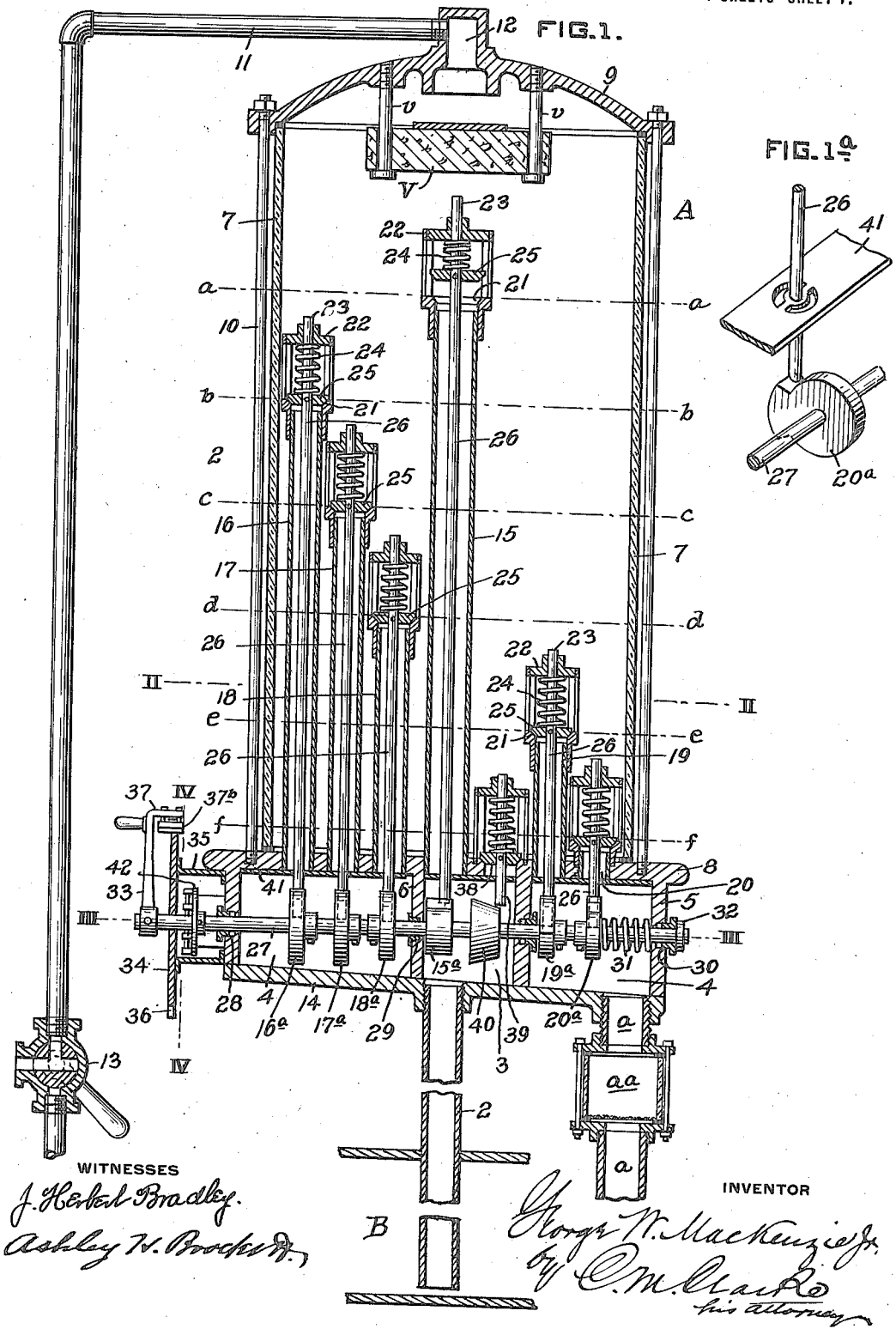

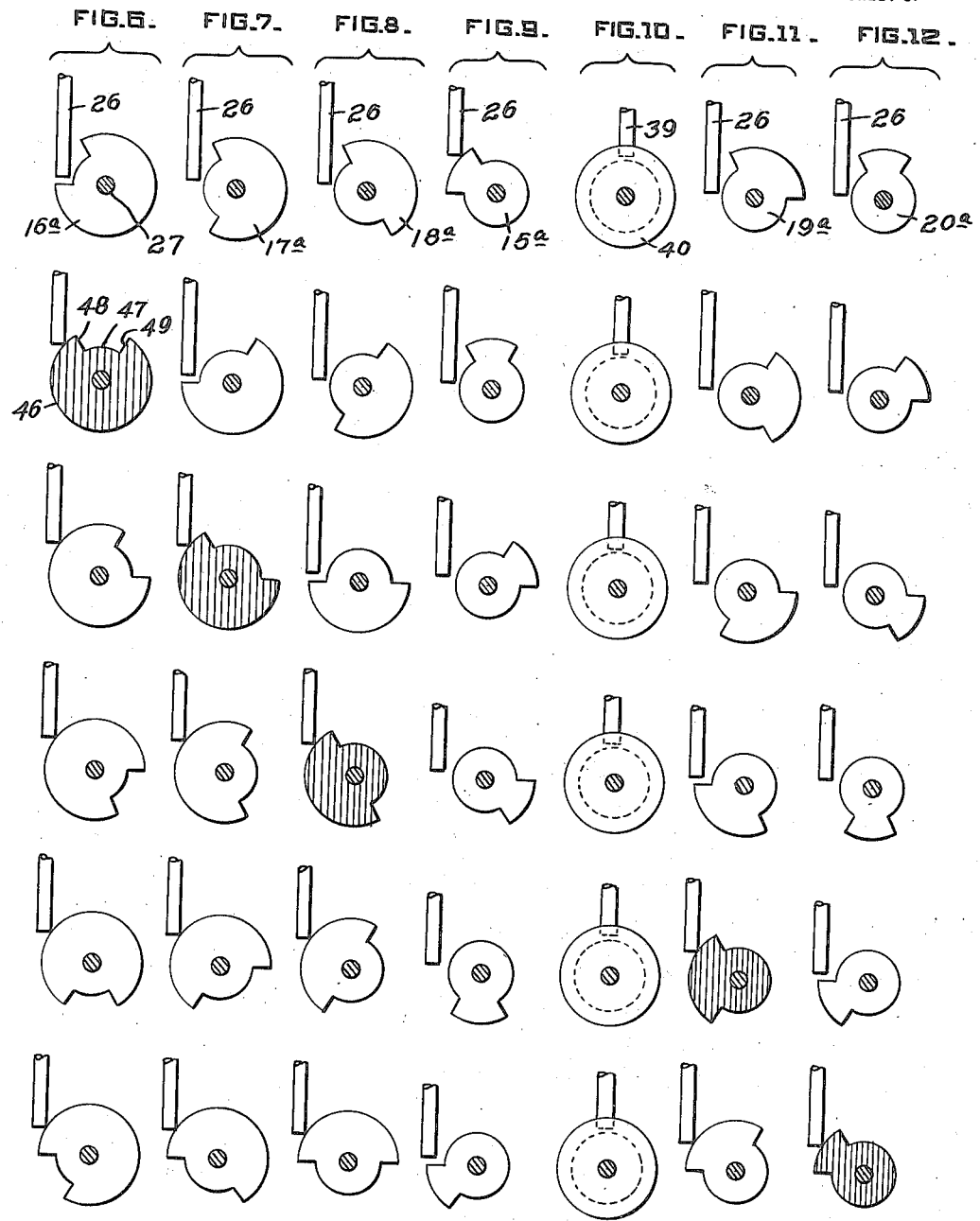

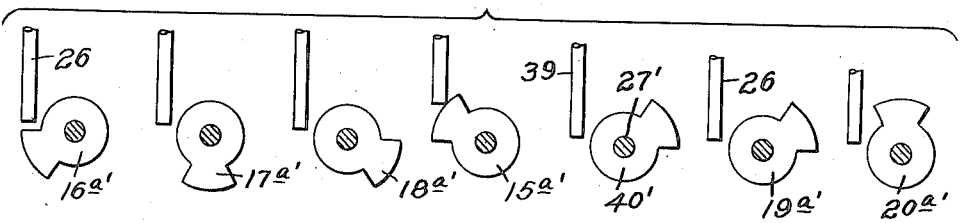
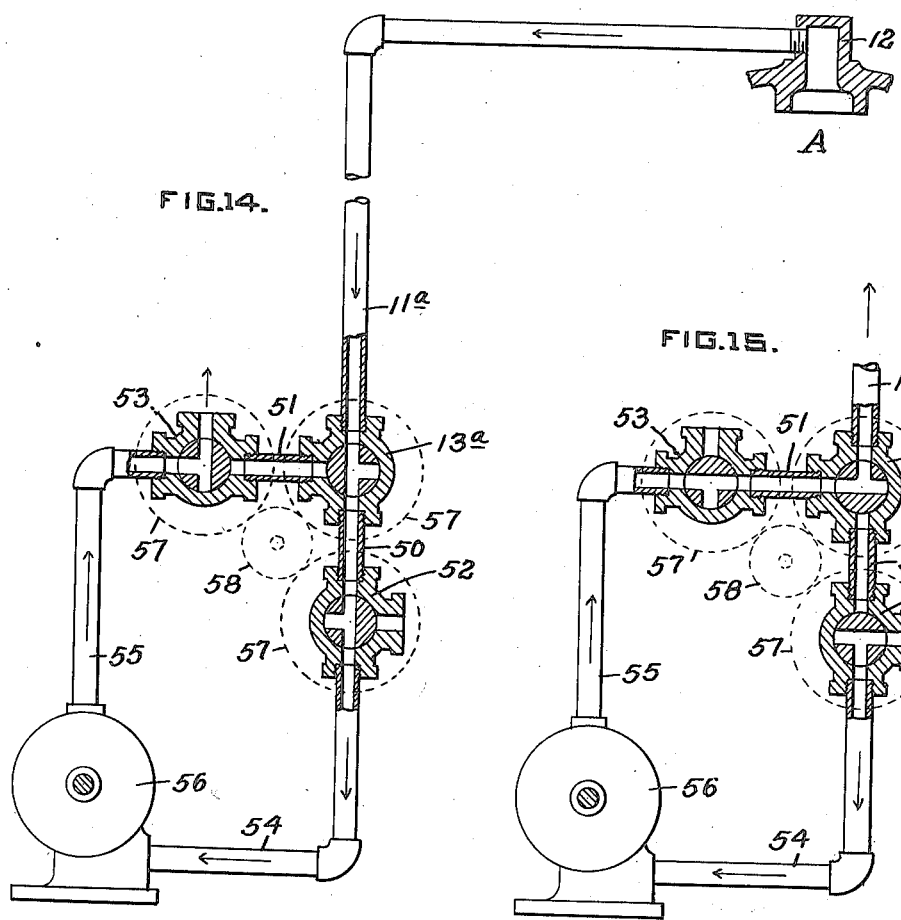

UNITED STATES PATENT OFFICE.

GEORGE W. MacKENZIE, JR., OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-MEASURING APPARATUS.

1,257,722.  Specification of Letters Patent.  Patented Feb. 26, 1918.

Application filed February 17, 1917. Serial No. 149,219.

*To all whom it may concern:*

Be it known that I, GEORGE W. MACKENZIE, Jr., a citizen of the United States, residing at Beaver, in the county of Beaver and State of Pennsylvania, have invented certain new and useful Improvements in Liquid-Measuring Apparatus, of which the following is a specification.

My invention consists of an improvement in apparatus for delivering gasolene or other liquids in measured quantities from a measuring or secondary tank connected with a main reservoir or source of supply at any suitable location adapted to receive the liquid from the main reservoir and to measure the amount to be delivered from the secondary tank to a purchaser or user, as hereinafter described.

The object of my invention is to provide a device of the class described having means for positively measuring the desired amount, within a preferably transparent casing, means for filling the casing to a definite maximum level, means for withdrawing overflow, means for ascertaining amounts down to any one of a plurality of definite measuring levels, means for withdrawing and returning any surplus liquid not used to the main reservoir, means for preventing fraudulent or unauthorized use of the device, means for registering the amount measured and delivered and various other features of construction and advantage as hereinafter described.

The improvement comprised in the present application relates to the same general type of apparatus as that disclosed in my prior application filed October 10, 1916, Ser. No. 124,823, utilizing atmospheric pressure to effect flow of the liquid from the main reservoir into a measuring vessel upon creation of a partial vacuum therein and permitting a delivery flow by gravity upon termination of such vacuum.

Referring to the drawings showing one preferred form of the apparatus:—

Figure 1 is a central vertical sectional view of the device showing the main inlet valve open.

Fig. 1ᵃ is a perspective detail view showing one of the valve stems, its apertured bearing, and its lifting dog.

Fig. 2 is a cross-sectional view indicated by the line II, II, of Fig. 1.

Fig. 3 is a similar view indicated by the line III, III, of Fig. 1.

Fig. 4 is a vertical sectional detail view indicated by the line IV, IV, of Fig. 1.

Fig. 5 is a face view of the controlling disk.

Fig. 5ᵃ is a sectional detail view of the operating lever and disk when at the position Vᵃ, Vᵃ, of Fig. 5.

Figs. 6 to 12 inclusive are assembled diagrammatic views showing in profile, series of consecutive positions of each of the actuating lifting dogs, and their relative successive positions with relation to the valve rods, it being understood that each figure comprises an entire vertical group, showing six consecutive positions.

Fig. 13 is a diagrammatic view showing the use of a series of uniform lifting dogs.

Fig. 14 is a sectional detail view showing a modified arrangement of piping, and valves for the air pump line providing for either exhaustion from or supply to the measuring tank, and showing the valves set for exhaust.

Fig. 15 is a similar view showing the valves set for supplying pressure.

Referring to Fig. 1, the secondary or measuring tank A which, in the preferred construction, is provided with a cylindrical glass body portion, is located at any desired position with relation to a primary or main reservoir or tank, for delivering fluid to a customer or user through a pipe *a* having a suitable controlling valve and delivery hose extension as desired.

A pipe 2 leads from the base portion of the measuring tank structure to a main reservoir B of any suitable kind and is in communication at its upper end with the interior of a restricted compartment 3 separated from the main delivery compartment 4 of base 5 by means of a surrounding wall 6.

The secondary or measuring tank A in the present construction consists of a cylindrical shell 7, preferably of glass, clamped between base 8 and top 9 by means of a series of rods 10 with any suitable intervening packing material whereby to provide a fluid and air-tight chamber. The advantage in having the body portion 7 entirely or partly of glass is to insure visibility of the contents.

For the purpose of creating a partial vacuum in the tank A, any suitable air-exhausting means may be employed, as a pump of suitable construction having a driving motor actuated by any available power, as will be readily understood.

The suction pipe 11 is connected with the pump and with the upper portion of tank A or its top 9, as indicated at 12, with intervening controlling valve 13, adapted to establish suction communication with the pump and to close such communication and open the interior of the tank to the outside atmosphere as indicated in Fig. 1.

Base 5 is provided with a bottom closing wall 14, which preferably slopes toward the delivery connection with pipe a, whereby to drain all of the contents of chamber 4 without any remaining surplus.

For the purpose of providing a series of over-flow levels of definite height, defining those levels down to which the liquid may be drawn in measured amounts, I provide a series of conduits, as pipes, communicating through the upper wall 8 of the base with the supply chamber 3 and with the distribution chamber 4 respectively. Of these, conduit 15 is the only one communicating with the supply chamber 3 and it extends upwardly to a maximum height, through which the liquid passes and enters the interior of the measuring reservoir and is only open at the top, during the existence of the partial vacuum within the chamber.

Any overfill or surplus flows backwardly through conduit 15 and chamber 3 and pipe 2 to the main reservoir when atmospheric conditions within the chamber are re-established.

Incidentally, a float valve V of cork or other suitable material, is loosely mounted on supporting stems $v, v$, for vertical movement, and operates to cut off the suction if the fluid rises sufficiently high to carry up the float.

Supplemental similar conduits 16, 17, 18, 19 and 20 respectively, extend upwardly through the top 8 of the base to varying predetermined desired heights, corresponding to the various measure-defining levels, and communicate with the interior of the measuring tank and with the distribution chamber 4.

Each of the said conduits and supply conduit 15, is provided at its upper end with a valve seat 21 and an upwardly extending cage which is laterally open to the interior of the vessel for free circulation. Each cage is provided with an upper terminal 22 providing a bearing for the valve stem 23 and for a seating spring 24 of valve 25. Each valve 25 is secured to valve stem 26; is normally seated by spring 24 in lowered position, and is raised by its particular lifting dog $15^a$, $16^a$, $17^a$, $18^a$, $19^a$ or $20^a$.

These several lifting dogs are each fixedly mounted on a controlling and actuating shaft 27, extending horizontally through the chamber base 5 and having rotatable and reciprocable bearings therein at suitable points 28, 29 and 30. Said bearings are preferably provided with stuffing-box glands whereby to insure a fluid-tight joint, and shaft 27 is adapted to be rotated and reciprocated therein.

A spring 31 is mounted between one inner end of base 5 and a suitable bearing abutment on the shaft, as lifting dog $20^a$, whereby to retract the shaft when thrust inwardly, as hereinafter described, limiting collar 32, restricting its movement. The shaft is provided with a turning lever or other suitable handle 33, secured to its other end and rotatable across the face of the disk 34, mounted outwardly beyond a meter box 35, set against the end of base 5.

Disk 34 is provided with any suitable limiting elements for determining the operative location of the shaft 27, as a series of annularly arranged stop notches 36, located at equally spaced positions annularly around its center.

The outer end of lever 33 is provided with an inwardly extending arm 37 in which is mounted by sliding pins $37^a$ a reciprocating bar $37^b$, having a V shaped edge adapted to engage each of the notches 36 by action of a cushion spring $37^c$ and to ride out of the notch by pressure on the lever. Bar $37^b$ is sufficiently long to engage the notches in either the thrust-in position, Fig. $5^a$, or in normal retracted position, Fig. 1.

This enables the operator to easily locate the lever at any one of the positions for delivering fluid down to the desired level. It also enables him to thrust the shaft 27 inwardly to raise stem 39 by cam 40 or dog 40' as hereinafter described, to release any undelivered fluid, at the same time thrusting all of the other lifting dogs out of registering engagement with the lower ends of the several valve rods 26.

The thrusting in movement of the shaft, by carrying all of the lifting dogs beyond the ends of the valve rods, allows all of the rods to drop, locking the machine against further operation until the shaft and dogs are returned to neutral position. This is because the rods interfere with at least one of the dogs in all positions except neutral.

A releasing valve 38, having stem 39, effects such release of undelivered liquid, its stem extending downwardly within range of a coniform releasing cam 40, mounted on shaft 27.

By thrusting the shaft 27 inwardly by its lever, at any position, stem 39 and valve 38 will be lifted by cam 40, allowing any surplus to return through chamber 3 and conduit 2 to main reservoir B. Also by thrusting shaft 27 inwardly to operate element 40, the engagement with the meter is also broken until the shaft is again returned to neutral position.

The several valve stems 26 extend at their lower portions through an apertured guide plate 41, or other suitable guiding mechanism, providing for free circulation of the liquid in either direction and insuring vertical movement of the several stems at all times. (See Fig. 1ª.)

Shaft 27 is provided within the meter box 35 with a spanner wheel 42, having a series of pins 43 operable to engage the star wheel 44 of a registering meter 45, whereby to register the amount of liquid withdrawn at each operation.

As constructed, the machine is designed to measure and deliver liquid, as gasolene, in unitary amounts or quantities as gallons, in any amount from 1 to 5 gallons, inclusive.

It operates to draw off the liquid from the interior of the measuring tank after the same has been filled by the supply conduit 15, up to, for instance, five gallon measuring level indicated by the line $a, a$. The several other conduits 16, 17, 18, 19, and 20, terminate in like manner, by the upper faces of their valve seats, at successively lower levels, indicated by the lines $b, b$; $c, c$; $d, d$; $e, e$, and $f, f$, respectively. By this arrangement it will be seen that the depth of liquid between any two adjacent levels may be made to exactly correspond in measurement to an arbitrary unit, as one gallon. Also that when the interior of the tank is to be filled, by lifting valve stem 26 of conduit 15, during continuance of the vacuum exhaust, liquid will flow therefrom into vessel A, up to the level $a, a$, any surplus returning during open position of valve 25, after terminating the vacuum exhaust by turning valve 13 to the atmosphere.

When valve 25 of next shorter conduit 16 is raised, one gallon will be drawn off between levels $a, a$, and $b, b$, and will flow downwardly into chamber 4 and by conduit $a$ will be delivered to the user. Incidentally, said conduit is provided at any convenient point in its length, with an inserted cylindrical section $a\ a$ of glass, whereby the flow of the liquid may be readily observed.

It will be observed also, that after conduit 15 has furnished its supply to the measuring chamber, and shaft 27 is rotated one sixth revolution to open the next lower valve to draw off one gallon, that dog 15ª will pass beyond the lower end of stem 26 and valve 25 will close. The inlet valve cannot be again opened to re-fill, either partly or wholly, until the shaft 27 has made a complete revolution, and is again at neutral position. This prevents partial refilling by renewal of suction after a partial withdrawal.

When valve 25 of next shorter conduit 17 is raised, an additional gallon may be drawn off in the same way, and so on successively throughout conduits 18, 19 and 20.

Likewise, when it is desired to withdraw two, three, four or five gallons with one setting of the lifting dogs, one or more of the several valves 25 may be kept opened at one time, effecting such purpose.

When it is desired to withdraw the entire five gallons immediately, all of the valves are raised, effecting withdrawal through all of the conduits simultaneously, so long as any liquid remains above the level $b, b$, after which it will fall downwardly through such of the conduits as are still below the level of the liquid, the last gallon between levels $e, e$, and $f, f$, flowing through conduit 20.

It will thus be seen that by setting the shaft 27 at either of five selected positions, any desired amount of liquid may be drawn off. The shaft is therefore capable of being set in such five different positions and also a sixth or neutral position, indicated by the blank space of spanner wheel 42, and by neutral position $n$ of disk 34, each of which is divided into six equal divisions.

The construction of the lifting dogs 15ª, 16ª, 17ª, 18ª, 19ª, and 20ª is shown diagrammatically in Figs. 6 to 12 inclusive, Fig. 10 showing the coniform cam 40 with relation to said several dogs in their six different positions, successively from top to bottom of the drawing.

In the neutral position, in which the machine is ready for filling, with valve 25 of conduit 15 raised, and with the valves of all of the other conduits closed, the lifting dog 15ª is in operative engagement with the valve stem, all of the other lifting dogs being in a corresponding neutral position, as indicated by the first horizontal series as shown on Sheet 3. The lifting dogs are each made of circular segmental form provided with a maximum active periphery 46 and a minimum inactive periphery 47 with intervening shoulders or abutments 48 and 49 respectively.

The annular lengths of the maximum peripheries 46 decrease successively in the order of disks 16ª, 17ª, 18ª, 19ª and 20ª, whereby to relatively locate shoulders 48 at successively retracted positions corresponding to one sixth of the entire periphery from the first to the last dog. Dogs 15ª and 20ª are of the same form, merely because the active peripheral portion of these two dogs correspond, as will be readily understood in connection with the theory of operation.

Thus, when the shaft 27 is in neutral position, with conduit 15 open, and it is desired to withdraw any desired amount of liquid from one to five gallons, the shaft is turned by lever 33, successively lifting one valve stem after another, and then stopped. Any surplus is then withdrawn by thrusting the shaft inwardly, releasing through valve 38, at the same time thrusting all of the dogs out of register with the stems and necessitating return to the neutral position, as stated.

Thus, by thrusting shaft 27 inwardly, emptying the vessel of the remaining liquid and at the same time throwing the several dogs out of register with the valve stems, they will all drop, while the stem action thrusts spanner wheel 42 and its pins out of range with star wheel 44, so that the meter will remain unaffected until the shaft is again placed in operative position.

From the foregoing description it is contemplated that all of the valves 26 be maintained open until the chamber is entirely emptied. It is not, however, necessary to retain either valve open any longer than just sufficient to permit the particular amount of liquid above its level to drain out. As a matter of fact, it is of considerable advantage under certain conditions to close each valve promptly upon liquid ceasing to flow through it, at the same time closing the particular conduit against air circulation.

In Fig. 13, I show a series of several lifting dogs 16$^a$' 17$^a$' 18$^a$' 40' and 20$^a$' as successively arranged on shaft 27 and in the order of their operation, except as to the element 40'. This is shown as a lifting dog of the same general construction as the others, and it will be observed that all of the lifting dogs are of the same form as to their projecting face portions. In the present case, element 40' is substituted for the cam 40 above described and is operable like the several other lifting dogs by reciprocation and rotation of shaft 27'. Thus, at whatever position lifting dog 40' may be in, when it is desired to empty the vessel of any remaining contents, all that is necessary is to first thrust shaft 27' inwardly (dog 40' being normally out of register with stem 39) and to then rotate the shaft (the several other lifting dogs being now out of register with their stems) until the projecting abutment or shoulder of dog 40' comes underneath the valve stem, when it may be raised in the same manner as already described, and held open until the vessel is emptied.

Likewise, when using a machine provided with the series of uniform lifting dogs as in Fig. 13, each lifting dog will operate successively on its particular valve stem, holding it raised during the time of withdrawal of the particular measured quantity defined by the particular valve which is open, whereupon continued rotation of shaft 27' will actuate the next consecutively succeeding valve stem, the preceding valve stem being, however, allowed to fall and closing its valve.

By this means I accomplish the opening action of that particular valve which corresponds to the particular dog which is provided for its stem. An especial advantage of this arrangement is that all of the several valves are maintained closed, including the valve of the main inlet conduit 15, during the opening of any particular withdrawal valve.

I have found in practice, that by closing all of the valves except the one through which the supply current is passing, air pressure may be utilized to assist the flow, by merely reversing the conditions of the measuring chamber. That is to say; I utilize the vacuum-creating mechanism after the chamber has been filled with liquid, to supply an expelling pressure, thereby greatly facilitating and shortening the time of operation.

This is done by the arrangement of piping, valves, and pump, illustrated in Figs. 14 and 15, in which case the pipe 11$^a$ leading to the upper portion of chamber A is provided with the three-way valve 13$^a$ and branch pipe connections 50, 51, each of which is provided with a three-way valve 52, 53, respectively, and a pipe 54 and 55, connecting with the pump 56. These several valves 13$^a$, 52 and 53 may also be provided either with single operating handles or with gearing 57, 57, 57, intermeshing with a master gear 58, as indicated by the dotted lines, whereby all of the valves may be operated together.

Pipe 54 is adapted to be directly connected with pipe 11$^a$ and with the intake portion of pump 56, for suction, as indicated in Fig. 14, the exhaust air passing to the atmosphere through valve 53, or pressure pipe 55 is adapted to be directly connected with pipe 11$^a$ for compression, valve 52 being open for intake to the atmosphere, as in Fig. 15. By this means a single setting of the valves provides for suction and a partial vacuum for putting the measuring machine into operation, while the valves may also be set to reverse the conditions and supply pressure to the interior of the measuring machine to assist emptying.

The construction and operation of the invention will be readily understood and appreciated from the foregoing description. The apparatus is comparatively simple, it is very accurate, not liable to get out of order, and possesses the several advantages above described.

It may be changed in design, construction or various details by the skilled mechanic or adapted to any desired volume or unit of measurement, but all such changes are to be considered as within the scope of the following claims.

What I claim is:—

1. A measuring vessel having a valve-controlled inlet conduit, a series of valve-controlled outlet conduits terminating at successively lower levels, means for effecting a flow of liquid by the inlet conduit into said vessel, and a single controlling and actuating element having a series of engaging elements adapted to successively and separately open said conduits.

2. A measuring vessel having a valve-controlled inlet conduit, a series of valve-controlled outlet conduits terminating at successively lower levels, means for effecting a flow of liquid by the inlet conduit into said vessel, and a single controlling and actuating element having a series of engaging elements adapted to successively and separately open said conduits.

3. A measuring vessel having a plural-chambered base, means for effecting a flow of liquid into the measuring vessel through a supply chamber of the base, and a valve-controlled outlet conduit opening from the measuring vessel into a delivery chamber of the base.

4. A measuring vessel having a plural-chambered base, means for effecting a flow of liquid into the measuring vessel through a supply chamber of the base, a plurality of valve controlled outlet conduits opening from the measuring vessel into a delivery chamber of the base, and a conduit leading from the delivery chamber.

5. A measuring vessel having a plural-chambered base, means for effecting a flow of liquid into the measuring vessel through a supply chamber of the base, a valve-controlled outlet conduit opening from the measuring vessel into a delivery chamber of the base, and a conduit leading from the delivery chamber provided with a transparent observation section.

6. A measuring vessel having a plural-chambered base, means for effecting a flow of liquid into the measuring vessel through a supply chamber of the base, and a series of valve-controlled outlet conduits terminating at successively lower levels within the measuring vessel and opening therefrom into a delivery chamber of the base.

7. In combination, a measuring vessel provided with an inlet circulation chamber and an outlet circulation chamber at its base, a valve-controlled conduit leading upwardly within the vessel from the inlet chamber, a series of valve-controlled outlet conduits extending upwardly and terminating at various heights within the vessel and leading into the outlet chamber, means for opening and closing said conduits, and a delivery conduit leading from the outlet chamber.

8. In combination, a measuring vessel provided with an inlet circulation chamber and an outlet circulation chamber at its base, a valve-controlled conduit leading upwardly within the vessel from the inlet chamber, a series of valve-controlled outlet conduits terminating at various heights within the vessel and leading into the outlet chamber, means for successively opening and closing said conduits, and a valve-controlled passage leading from the extreme bottom of the vessel to the inlet chamber.

9. In combination, a measuring vessel provided with a base having an inlet circulation chamber and an outlet circulation chamber, a conduit leading to the inlet circulation chamber from a source of supply, a conduit leading from the inlet circulation chamber upwardly into the measuring vessel and provided with an opening and closing valve and stem, a series of conduits leading from different levels within the vessel downwardly to the outlet circulation chamber, each having an opening and closing valve and stem, means for actuating each of said valves separately, means for effecting flow of liquid into the measuring vessel, and a delivery conduit leading from the outlet circulation chamber.

10. In combination, a measuring vessel provided with a base having an inlet circulation chamber and an outlet circulation chamber, a conduit leading to the inlet circulation chamber from a source of supply, a conduit leading from the inlet circulation chamber upwardly into the measuring vessel and provided with an opening and closing valve and stem, a series of conduits leading from different levels within the vessel downwardly to the outlet circulation chamber, each having an opening and closing valve and stem, means for actuating each of said valves separately, means for effecting flow of liquid into the measuring vessel, a registering device operable in combination with said valve-actuating means, and a delivery conduit leading from the outlet circulation chamber.

11. In a measuring apparatus of the class described, a casing, means for filling the casing to a predetermined level, a series of individual withdrawal conduits extending upwardly within said casing and having valve-controlled terminals located at different measuring levels, and a controlling device provided with a series of valve-actuating elements for opening the several terminals as desired.

12. In a measuring apparatus of the class described, a casing, means for filling the casing to a predetermined level, a series of individual withdrawal conduits extending upwardly within said casing and having valve-seated terminals located at different measuring levels, a valve for each of said terminals having a lifting rod, and a shaft having a series of lifting dogs operable in one direction to successively engage and lift said rods.

13. In a measuring apparatus of the class described, a casing, means for filling the casing to a predetermined level, a series of individual withdrawal conduits within said casing having valve-seated terminals located at different measuring levels, a valve for each of said terminals having a lifting rod, and a reciprocable shaft having a series of lifting dogs operable in one direction to successively engage and lift said dogs, and adapted to be shifted out of register therewith.

14. In combination, a measuring vessel provided with an inlet circulation chamber and an outlet circulation chamber at its base, a valve-controlled conduit leading upwardly within the vessel from the inlet chamber, a series of valve-controlled outlet conduits extending upwardly and terminating at various heights within the vessel and leading into the outlet chamber, a shaft having a series of lifting dogs thereon adapted to successively open said valved outlet conduits, and a delivery conduit leading from the outlet chamber.

15. In combination, a measuring vessel provided with a base having an inlet circulation chamber and an outlet circulation chamber, a conduit leading to the inlet circulation chamber from a source of supply, a conduit leading from the inlet circulation chamber upwardly into the measuring vessel and provided with an opening and closing valve and stem, a series of conduits leading from different levels within the vessel downwardly to the outlet circulation chamber, each having an opening and closing valve and stem, means for successively actuating said valves, means for effecting flow of liquid into the measuring vessel, and a delivery conduit leading from the outlet circulation chamber.

16. In combination, a measuring vessel provided with a base having an inlet circulation chamber and an outlet circulation chamber, a conduit leading to the inlet circulation chamber from a source of supply, a conduit leading from the inlet circulation chamber upwardly into the measuring vessel and provided with an opening and closing valve and stem, a series of conduits leading from different levels within the vessel downwardly to the outlet circulation chamber, each having an opening and closing valve and stem, a shaft having a series of lifting dogs thereon adapted to successively open and close said valves, and a delivery conduit.

17. In combination, a measuring vessel provided with an inlet circulation chamber and an outlet circulation chamber at its base, a valve-controlled conduit leading upwardly within the vessel from the inlet chamber, a series of valve-controlled outlet conduits extending upwardly and terminating at various heights within said vessel and leading into the outlet chamber, a shaft having a series of lifting dogs thereon adapted to successively open said valved outlet conduits, and a delivery conduit leading from the outlet chamber and provided with a transparent observation section therein.

In testimony whereof I hereunto affix my signature.

GEORGE W. MacKENZIE, Jr.